No. 836,038. PATENTED NOV. 13, 1906.
F. J. HIPP.
FISH HOOK.
APPLICATION FILED JAN. 25, 1906.

WITNESSES
INVENTOR
FRANK J. HIPP.
BY
HIS ATTORNEYS.

UNITED STATES PATENT OFFICE.

FRANK J. HIPP, OF NEW BRIGHTON, MINNESOTA.

FISH-HOOK.

No. 836,038.

Specification of Letters Patent.

Patented Nov. 13, 1906.

Application filed January 25, 1906. Serial No. 297,769.

*To all whom it may concern:*

Be it known that I, FRANK J. HIPP, of New Brighton, Ramsey county, Minnesota, have invented certain new and useful Improvements in Fish-Hooks, of which the following is a specification.

My invention relates to improvements in fish-hooks designed for either trolling or casting and to be used without bait.

The invention consists generally in various constructions and combinations, all as hereinafter described.

Figure 1:
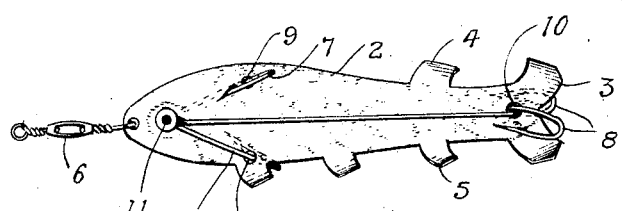
Figure 2:
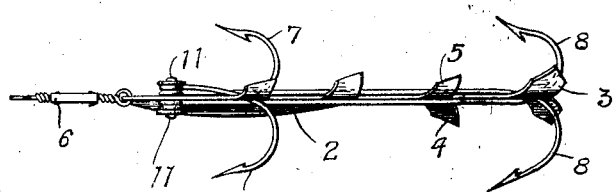
Figure 3:
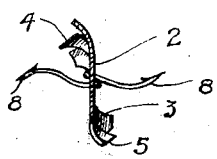

In the accompanying drawings, forming part of this specification, Figure 1 is a side view of a fish-hook embodying my invention. Fig. 2 is a top view of the same. Fig. 3 is a transverse sectional view.

In the drawings, 2 represents the body of the device, made in the shape of a minnow having a tail 3, a back-fin 4, and belly-fin 5 of suitable size and shape to represent the fins of a fish and laterally turned to cause a whirling movement to be imparted to the body when drawn through the water. An attachment 6 for a line is provided at the forward end of the body, and pairs of hooks 7 and 8 are mounted on the body, with their shanks projecting through holes 9 and 10 therein.

The hooks 7 preferably have their shanks near the forward end of the body 2, while the hooks 8 are provided with shanks extending nearly the entire length of the body, the barbs of each hook being on the opposite side of the body from the main portion of the shank of that hook.

On the forward end of the body I provide a rivet 11, whereon the shanks of the hooks are secured, two on each side of the body 2. The ends of the rivet are flattened and painted to represent the eyes of a fish. Other suitable securing means may be used in place of the rivet, if preferred. When the body portion 2 is formed, suitable scales may be stamped thereon, which will glisten when the device is drawn through the water and represent more perfectly a live minnow.

The device may be made in suitable sizes and provided with different sizes of hooks and any suitable number of them.

Part 2, representing the body of the fish, may be painted or colored in any suitable way, and when it is drawn through the water it will whirl rapidly and resemble very closely a swiftly-swimming minnow.

I claim as my invention—

1. An artificial bait, comprising a sheet-metal body portion formed to represent a fish and having suitable fins and a tail, and provided with holes near its head above and below its longitudinal center and also having a hole in its tail, hooks arranged in pairs upon said body portion, the forward hooks having their shanks extending through the holes near the head of said body portion and the rear hooks having their shanks extending through the hole at the tail of the body portion, and all of said shanks extending forward to said head, and a rivet provided in the head of said body portion and securing all of said hooks thereon, substantially as described.

2. An artificial bait, comprising a body portion fashioned to represent a fish and having suitable fins and a tail and provided with holes near its head and also having a hole in its tail, hooks arranged in pairs upon said body portion, the forward hooks having their shanks extending through the holes near the head of said body portion and the rear hooks having their shanks extending through the hole in the tail of said body portion, and all of said shanks extending forward to said head, and means securing all of said hooks near the head of said body portion.

3. An artificial bait, having a body portion formed to represent a fish and provided with fins and a tail and holes near the head and tail of the body portion, and hooks having their shanks extending through the holes in said body portion and secured thereto near the head thereof, the points or barbs of said hooks being on the opposite side of said body portion from the point where their shanks are secured to said body portion, whereby the hooks will be rigidly held, substantially as described.

In witness whereof I have hereunto set my hand this 19th day of January, 1906.

FRANK J. HIPP.

Witnesses:
RICHARD PAUL,
C. G. HANSON.